3,671,307
CREASE-PROOFING COMPOSITIONS CONTAINING GLYOXAL MODIFIED URON RESINS AND PROCESSES FOR MAKING SAME
Myrtle Joanne Spangler, Danville, Va., assignor to Dan River Inc., Danville, Va.
No Drawing. Filed Dec. 4, 1969, Ser. No. 882,346
Int. Cl. C08g 9/10, 9/32; D06m 15/58
U.S. Cl. 117—139.4
9 Claims

ABSTRACT OF THE DISCLOSURE

Crease-proofing compositions containing methylol urons and/or alkyl ethers of same and methylol-4,5-dihydroxy-2-imidazolidinone and/or alkyl ethers of same substantially free of methylol ureas and alkyl ethers thereof. These compositions are made by contacting uron preparations, made by reacting urea and formaldehyde, with or without an alkanol, with glyoxal to convert methylol ureas and alkyl ethers thereof ordinarily contained in such uron preparations into methylol-4,5-dihydroxy-2-imidazolidinone and/or alkyl ethers thereof. Cellulosic textiles treated with the resulting compositions are characterized by unexpectedly low retained chlorine damage.

BACKGROUND OF THE INVENTION

(a) Field of the invention

The present invention relates to novel crease-proofing compositions which contain predominantly methylol urons, such as, bis(methylol) uron, and/or alkyl ethers thereof and relatively small amounts of methylol-4,5-dihydroxy-2-imidazolinones, such as 1,3-dimethylol-4,5-dihydroxy-2-imidazolidinone, and which are substantially free of methylol ureas and alkyl ethers thereof. The invention also relates to processes for making the novel compositions which involves contacting uron preparations, made by condensing urea and formaldehyde with or without an alkanol, with glyoxal under alkaline conditions at increased temperatures to convert methylol ureas and alkyl ethers thereof inherently present in said uron preparations into methylol-4,5-dihydroxy-2-imidazolidinone and alkyl ethers thereof. Fabrics treated with such compositions are characterized by unexpectedly lower retained chlorine damage and the novel compositions are more suitable in uses such as the treatment of textiles for the purpose of imparting wrinkle resistance, crease and shape retention, stiffness and/or other special effects.

(b) Description of the prior art

Methylol urons, such as, N,N'-bis(methylol) uron, and their alkyl ethers, such as, N,N'-bis(methoxymethyl) uron are well known materials. For example, materials of this type were disclosed in Japan in 1935 and 1936 (Bull. Chem. Soc., Japan, 11, 259, 1936 and Osaka Kogyo Shikensho Hokoku, 16th, No. 6, p. 23, 1935). The urons and methods for making them are also disclosed in U.S. Pat. Nos. 2,373,135; 2,374,647; 3,079,279; 3,089,859 and 3,445,279.

As is well known, urons of the type described above are produced under alkaline conditions by condensing urea and formaldehyde in a mole ratio of 1 mole of urea to at least 4 moles of formaldehyde to provide N,N'-bis (methylol) uron. Residual amounts of methylol urea inevitably remain. It is also well known to etherify the N,N'-bis(methylol) uron with a lower alkanol under acid conditions to produce the alkyl ether derivatives, e.g., N,N'-bis (alkoxymethyl) uron.

Urons of the type mentioned above could be highly valuable agents in the treatment of cellulosic textiles except for the characteristic of imparting to the textile relatively high levels of retained chlorine damage and a relatively high formaldehyde odor in the unwashed, treated fabric. The formaldehyde odor problem has been greatly magnified by the commercialization of permanent press garments of the post-cured type in which a resin-treated, unwashed fabric is made up into a garment before curing. Many attempts have been made to reduce or eliminate these shortcomings with very little real success.

U.S. Pat. Nos. 3,089,859 and 3,445,279 seek to overcome the characteristics of high retained chlorine damage by utilizing excessive amounts of formaldehyde during or after the uron formation. While these procedures have had some small effect on reducing retained chlorine damage, they obviously have worsened the formaldehyde odor problem.

U.S. Pat. No. 3,079,279 attempts to overcome the characteristic of high retained chlorine damage by adding N-alkyl substituted or unsubstituted 4,5-dihydroxy-2-imidazolidinones to a wide variety of aminoplasts including urons. This procedure has somewhat reduced retained chlorine damage of a number of aminoplasts but has little effect, if any, in reducing formaldehyde odor. While the patent does not mention a reduction of retained chlorine damage when the additive is used with urons, it has been found, as shown in the examples provided hereinafter, that any reduction is marginal at most. Moreover, additives disclosed in this patent are expensive.

Despite the above attempts, the retained chlorine damage problem and the formaldehyde odor problem have limited the use of urons and have prevented them from reaching their full potential, in the treatment of cellulosic textiles.

SUMMARY OF THE INVENTION

The present invention provides methods for substantially reducing the retained chlorine damage problem associated with aqueous mixtures containing methylolated urons and/or alkyl ether derivatives of same and permits the utilization of such mixtures to their fullest advantage. The methods of this invention also provide for the control of formaldehyde odor of such aqueous mixtures to acceptable low levels. The methods of this invention involve the heating of such mixtures in the presence of glyoxal under alkaline conditions.

The present invention also provides novel compositions mainly of methylolated urons and minor amounts of methylolated 4,5-dihydroxy-2-imidazolidinones, as such or in their alkylated forms.

The invention is applicable to all types of methylolated urons employable in the treatment of fabrics. Such methylolated urons include N,N'-bis(methylol) urons and alkyl ether derivatives thereof.

Stated as a formula the methylolated urons employed include those of the formula:

(1)

wherein R is hydrogen or a lower alkyl having 1 to 6 carbon atoms including methyl, ethyl, propyl, isopropyl, butyl, isobutyl, pentyl, hexyl and the like. R may be the same or different in each molecule. The methylolated urons used herein can include those having one N-methylol group or N-alkoxymethyl group as well as those having two N-methylol or N-alkoxymethyl groups per molecule as well as mixtures thereof.

These urons are well known in the art and are described, along with methods for making them, in such patents as are mentioned hereinabove. In general, the urons of the above formula in which R is hydrogen are produced by condensing urea and formaldehyde to form mainly the methylolated uron. This reaction can be depicted by the idealized equation:

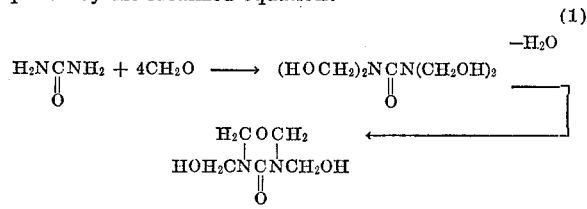

(1)

This reaction, in practice, is believed to yield a mixture of predominantly N,N'-bis(methylol) uron as shown in Equation 1 and smaller amounts of methylol ureas and possibly derivatives thereof. These methylol ureas and derivatives are collectively referred to herein as "unreacted residues." Because of the reactivities of the uron product and the unreacted residues, it is not possible to economically separate the unreacted residues from the product on a commercial scale.

The conditions of the uron-forming reactions idealized in Equation 1 are well known. These reactions generally are carried out under alkaline conditions and at elevated temperatures, e.g., 30° C. up to atmospheric reflux temperatures, for one hour or less to six hours or more. The later stages of the reaction are preferably conducted under vacuum to assist in driving off the water especially at lower temperatures. An excess of formaldehyde over the stoichiometric amount can be used. Any of the methods for producing urons shown in the above-mentioned patents can be employed and such patent disclosures are incorporated herein by reference.

Thereafter, the uron product of Equation 1 can be etherified with an alkanol to produce the alkyl ether derivatives thereof. This reaction can be depicted by the idealized equation:

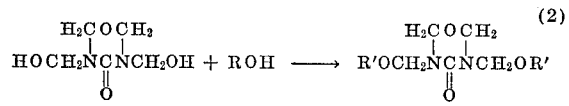

(2)

wherein R' designates alkyl preferably of 1 to 6 carbon atoms. This reaction, in practice, is believed to convert those unreacted residues containing methylol groups to their corresponding alkyl ether derivatives which also cannot be economically separated on a commercial scale. Thus, the product of Equation 2 is a mixture of the N,N'-bis(alkoxymethyl) uron and the alkyl ethers of unreacted residues.

The conditions of the alkylation reaction of Equation 2 are well known. This reaction generally is carried out under acid conditions and at elevated temperatures, e.g., 30° C. up to atmospheric reflux temperatures, for one hour or less to six hours or more. An excess of alkanol over the stoichiometric amount can be used and is usually preferred. Any of the methods for alkylating urons shown in the above-mentioned patents can be employed and each such patent disclosure is incorporated herein by reference.

The method of the present invention comprises the step of contacting the product mixtures of Equation 1 or Equation 2 with glyoxal in at least a sufficient amount to react with the unreacted residues and alkyl ethers thereof. The conditions used in this step are the well known conditions used in reacting glyoxal with urea and formaldehyde condensation products to form 4,5-dihydroxy-2-imidazolidinone or 1,3-dimethylol-4,5-dihydroxy-2-imidazolidinone. Such conditions include a neutral to alkaline pH, for example, about 7 to about 10.5, preferably about 8 to about 9.5, and moderately elevated temperatures, for example, about 40° C. to about 100° C., and preferably about 50° C. to about 60° C. The time of contact under these conditions can vary widely, for example, about 30 minutes to about 64 hours, preferably, about 2 hours to about 24 hours.

The glyoxal reacts with the unreacted residues or their alkyl ethers to form N-methylol 4,5-dihydroxy-2-imidazolidinones, such as, 1,3-dimethylol-4,5-dihydroxy-2-imidazolidinone and/or N-alkoxymethyl 4,5-dihydroxy-2-imidazolidinone, such as 1,3-bis(alkoxymethyl)-4,5-dihydroxy-2-imidazolidinone.

When the product mixture of Equation 1 is contacted with glyoxal in accordance with the invention, the resulting product mixture can then be etherified or alkylated to form the corresponding alkyl ethers. The etherifying conditions mentioned above are employed for this purpose.

The novel compositions of this invention consists essentially of about 95 to about 66 mol percent, preferably about 85 to about 75 mole percent of a uron having the Formula 1 given above and about 5 to about 34 mole percent, preferably about 15 to about 25 mole percent of a 4,5-dihydroxy-2-imidazolidinone of the formula:

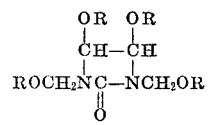

wherein R is as defined in Formula 1 above, and may be the same or different in each molecule. The novel compositions are substantially free of methylol ureas, such as dimethylol urea which are believed responsible for the high retained chlorine damage and unacceptable odor levels of uron compositions heretofore known.

The novel compositions of this invention are conveniently applied to cellulosic textile fabrics as an aqueous solution having a solids content which can be varied over a wide range, which, however, preferably would not extend below 2% nor above 80%. The aqueous treating solution can also contain other ingredients, such as, softeners, wetting agents, water repellents, soil repellents, and the like, in addition to a suitable curing catalyst, such as, zinc nitrate, magnesium chloride, isopropanolamine hydrochloride or any other acidic salt catalyst or mixtures thereof. Any curing catalyst conventionally employed to cure nitrogenous crease-proofing chemicals can also be employed to cure the novel chemicals for this invention.

The aqueous treating solutions are applied to the cellulosic fabric and conventional techniques such as padding can be employed. The pick-up of the fabric can also vary over a wide range, e.g., wet pick-ups of 50 to 100 percent based on the weight of the fabric.

After application to the fabric, the crease-proofing mixture carried by the fabric is cured with the fabric under suitable curing conditions such as at a curing temperature of 250 to 400° F. for 15 minutes to ½ minute. If desired, the fabric can be dried after application of the treating solution and prior to curing. While air drying at ambient temperatures can be employed, it is more expeditious to dry at elevated temperatures.

After application to the fabric, the composition can be fully cured, partly cured or substantially uncured. When fully cured, wrinkle and crease resistance are imparted. When partly cured or substantially uncured, the dried fabric can be shaped and fabricated into an article such as a garment and then post-cured to impart wrinkle resistance and shape retention, such as durable creases and pleats.

The fabric to be treated may be prepared in any desired manner, such as by singeing, desizing, bleaching and other operations prior to impregnating with the novel crease-proofing mixture and catalyst according to the present invention. Substantially, any type of cellulosic fabric can be treated according to this invention. For example, 100 percent cotton woven fabrics, cotton-synthetic fiber blends, 100 percent rayon, rayon-synthetic fiber blends, rayon-cotton blends, all can be treated in accordance with this invention to provide the advantages set forth hereinabove. The term synthetic or other fibers is intended to include rayon fibers, polyester fibers, such as Fortrel (registered trademark of Fiber Industries, Inc.), which is a polyester comprising a polymerized polycondensate of terephthalic anhydride and ethylene glycol; nylon; polymers containing at least 80 percent polymerized acrylonitrile, such as those available commercially under the trade names Orlon and Acrilan, and so on. Staple synthetic fibers, or continuous synthetic filaments, as desired, can be employed in the ways that are well known in the art. This invention, nevertheless, can be applied with advantage to any woven or knitted cellulosic fabric, with or without any amount of synthetic or other fibers. The term "cellulosic textile fabric" as used herein means any of the above-described fabrics, including blends which contain cellulosic fibers such as cotton, rayon and the like.

The novel mixtures when used to treat cellulosic fabrics result in fabrics of high wrinkle resistance, consistently low chlorine retention damage and acceptable formaldehyde odor.

DESCRIPTION OF SPECIFIC EMBODIMENTS

The following examples are presented wherein, unless otherwise specified, parts and percentages are on a weight basis. The crease-resistance values were determined by the Monsanto Crease Recovery Test (A.A.T.C.C. Tentative Test Method 66–1959T), the filling tear strength values were determined by the Trapezoid method, the filling tensile strength values were determined by the Grab method, the percent damage from retained chlorine values were determined by A.A.T.C.C. Standard Test Method 92–1962. Each home wash included the cycle of washing, spinning, rinsing and spinning in a Bendix automatic washer, using "All" detergent manufactured by the Monsanto Chemical Company. After each cycle, the sample being subjected to the home wash treatment was tumble dried. The formaldehyde content, expressed as parts per million (p.p.m.), was determined by A.A.T.C.C. Test Method 112–1968.

Example 1

(A) A mixture of 750 parts of an aqueous solution containing 60% formaldehyde (15 moles), 25% urea (3.1 moles) and 15% water was maintained at a pH of 11 and was heated at about 60° C. for about two hours. After this period the infra-red spectrum of the mixture showed a slight peak at 6.5 microns. At this point, the mixture contained a predominant amount of N,N'-dimethylol uron and a small amount of methylol urea. The pH was then adjusted to about 9.0 by adding a sufficient amount of HCl.

(B) Then, 90 parts of 40% aqueous glyoxal (0.62 mole) were added to the mixture obtained in Part A above and the resulting mixture was held at a temperature of about 50° C. for about 1 hour. After this period of reaction the infra-red spectrum of the mixture showed no peak at 6.5 microns and thus no methylol urea content. The resulting mixture was calculated as containing about 80 mole percent N,N'-dimethylol uron and about 20 mole percent 1,3 - dimethylol-4,5-dihydroxy-2-imidazolidinone and had about 73% solids content.

(C) Two aqueous textile treating solutions were prepared from the mixtures obtained in Parts A and B above. One solution contained about 8% solids of, respectively, the mixture of N,N'-bis(hydroxymethyl) uron and methylol ureas obtained in Part A and the other solution contained (at the same solids content) the mixture of N,N'-bis(hydroxymethyl) uron and 1,3-bis(hydroxymethyl)-4,5-dihydroxy-2-imidazolidinone obtained in Part B. To each solution there was added 1% solids of magnesium chloride hexahydrate catalyst based on the total solution weight.

Each solution was applied to woven cotton fabric (3.2 oz./sq. yd., 85 x 74) at a 75% wet pick-up. The resulting impregnated fabric was dried and cured at 160° C. for one and one-half minutes. The properties of the thus treated fabrics are given in Table 1:

TABLE 1

| Solution | Crease resistance | Strength | | Retained Cl damage, percent | P.p.m. F |
| --- | --- | --- | --- | --- | --- |
| | | Tear | Tensile | | |
| A | 247 | 1.5 | 45 | 80 | 1,600 |
| B | 265 | 1.3 | 44 | 48 | 1,400 |

This example illustrates the considerably lower retained chlorine damage of fabrics treated with compositions of this invention (solution B) as compared to bis(methylol) uron compositions (solution A) not treated according to this invention.

Example 2

450 grams of the product in Part B of Example 1 were vacuum stripped at 60° C. and 30 mm. Hg reduced pressure to reduce the weight of the product by about 25% and, thus, remove most of the water. Then, 300 g. of methanol were added along with sufficient HCl to reduce the pH to about 1.5. The reaction mixture was then stirred at 40° C. for about 1 hour and then neutralized with aqueous sodium hydroxide. The resulting methylated product was an aqueous solution containing about 56% solids.

Example 3

(A) An aqueous solution, 1200 parts, containing 60% formaldehyde (24 moles), 25% urea (5 moles) and 15% water was adjusted to pH 11 with sufficient sodium hydroxide. The solution was maintained at about 60° C. for about three hours. After this period, the mixture contained a predominant amount of N,N-dimethylol uran and a small amount of N-methylol ureas.

The resulting mixture was neutralized with sufficient HCl and vacuum distilled to remove substantially all water present. Then 1800 g. (16 moles) methanol were added and the pH of the resulting mixture was reduced to about 1.8 with sufficient HCl. The mixture was then stirred at a temperature of about 50° C. for about 1 hour and then neutralized with adequate sodium hydroxide. Unreacted methanol was distilled from the resulting product by heating under reduced pressure. The resulting mixture contained predominantly N,N'-bis(methoxymethyl) uron and small amounts of N-methoxymethyl ureas.

(B) Then, one mole of glyoxal as a 40% aqueous solution was added to the mixture prepared in Part A above and the pH of the mixture was raised to about 9.0 with sufficient sodium carbonate. The resulting mixture was maintained at a temperature of about 50° C. for about one hour. After this period of reaction, the infra-red spectrum of the resulting mixture showed no N-methoxymethyl urea content. The resulting mixture was calculated as containing about 80 mole percent N,N'-bis(methoxymethyl) uron and about 20 mole percent 1,3-bis(methoxymethyl)-4,5-dihydroxy-2-imidazolidinone and had about 40% solids content.

(C) Three aqueous textile treating solutions were prepared from the mixtures obtained in Parts A and B of this example and the mixture obtained in Example 2. One solution contained about 8% solids of, respectively, the mixture of N,N'-bis(methoxymethyl) uron and N - methoxymethyl urea obtained in Part A, the second solution contained (at the same solids content) the mixture of N,N'-bis(methoxymethyl) uron and 1,3-bis(methoxymethyl)-4,5-dihydroxy-2-imidazolidinone obtained in Part B, and the third solution (referred to as solution C) contained (at the same solids content) the mixture of Example 2. To each solution there was added 1% solids of magnesium chloride hexahydrate catalyst based on the total solution weight.

Each solution was applied to woven cotton fabric (3.2 oz./sq. yd., 85 x 74) at a 75% wet pick-up. The resulting impregnated fabric was dried and cured at 160° C. for one and one-half minutes. The properties of the thus treated fabrics are given in Table 2.

TABLE 2

| Solution | Crease resistance | Strength Tear | Strength Tensile | Retained Cl damage, percent | P.p.m. F |
|---|---|---|---|---|---|
| A | 253 | 1.2 | 46 | 32 | 600 |
| B | 270 | 1.1 | 42 | 13 | 500 |
| C | 268 | 1.2 | 40 | 4 | 560 |

This example illustrates the low retained chlorine damage of fabrics treated with compositions of this invention (solutions B and C) as compared to compositions (solution A) not treated according to this invention.

Example 4

This example illustrates the reduction of retained chlorine damage on cellulosic fabrics by the compositions of this invention as compared to a mixture prepared by mixing 4,5-dihydroxy-2-imidazolidinone with a methylated methylol uron prepared in a manner similar to Example 3A.

Six aqueous textile treating solutions were prepared.

Solutions A and B contained the crease-proofing agent prepared in the manner described in Example 3B.

Solutions C and D contained a crease-proofing agent prepared by mixing a mixture prepared in the manner described in Example 3A with 4,5-dihydroxy-2-imidazolidinone in a mole ratio of 4 to 1, respectively.

Solutions E and F contained a crease-proofing agent prepared by mixing a mixture prepared in the manner described in Example 3A with 4,5-dihydroxy-2-imidazolidinone in a mole ratio of about 2.1 to 1, respectively.

Solutions C, D, E and F do not illustrate the present invention but were prepared under the teachings of U.S. Pat. 3,079,279.

The respective solids content of the crease-proofing agent in each solution is given in Table 3. Magnesium chloride hexahydrate catalyst was added to each solution in the respective amounts given in Table 3 in percentages based on the total weight of treating solution.

Each solution was applied to woven cotton fabric (3.2 oz./sq. yd., 85 x 74) at a 75% wet pick-up. The resulting impregnated fabric was dried and cured at 330° F. for two minutes. The properties of the thus treated fabrics are given in Table 3 below:

Solution B contained 9% solids of the crease-proofing agent prepared in the manner described in Example 2.

Both solutions contained 1% magnesium chloride hexahydrate based on the total weight of solution.

Each solution was applied to woven cotton fabric as described in Example 1 and cured in the manner described in Example 1. The properties of the thus treated fabrics are given in Table 4 below:

TABLE 4

| Solution | Crease resistance | Tear strength | Chlorine retention damage Orig. | Chlorine retention damage 5 HW | Chlorine retention damage 2 CW | P.p.m. F (unwashed) |
|---|---|---|---|---|---|---|
| A | 293 | 1.9 | 10 | 32 | 71 | 620 |
| B | 293 | 2.0 | 21 | 20 | 20 | 480 |

These results illustrate the improvements provided by the compositions of this invention in durability of reduced chlorine retention damage and formaldehyde odor over a widely used commercial crease-proofing agent.

What is claimed is:

1. Process for preparing a textile crease-proofing aminoplast substantially free of methylol ureas and alkyl ethers thereof which process comprises reacting a reaction mixture selected from the group consisting of (1) N,N'-dimethylol uron obtained by reacting urea and formaldehyde to form said N,N'-dimethylol uron mixed with unreacted N-methylol ureas, and (2) lower alkylated derivatives thereof obtained by reacting said N,N'-dimethylol uron mixed with said unreacted N-methylol ureas with a lower alkanol to form N,N'-bis (lower alkoxymethyl) uron and N-lower alkoxymethyl ureas, with at least sufficient glyoxal at an elevated temperature under neutral to alkaline conditions to convert said unreacted N-methylol ureas and said unreacted N-lower alkoxymethyl ureas to 1,3-dimethylol-4,5-dihydroxy-2-imidazolidinone and 1,3-bis (lower alkoxymethyl)-4,5-dihydroxy-2-imidazolidinone, respectively.

2. A textile crease-proofing composition comprising an aminoplast crease-proofing portion consisting essentially of the aminoplast prepared according to claim 1 and containing about 95 to about 66 mol percent of said uron and about 5 to about 34 mol percent of said imidazolidinone.

3. Composition as claimed in claim 2 wherein said uron

TABLE 3

| Solution | Percent Solids content of crease-proofing agent | Catalyst content | Crease resistance, degrees | Strength Tear | Strength Tensile | Retained Cl damage (percent) |
|---|---|---|---|---|---|---|
| A | 6 | 2 | 280 | 1.1 | 27 | 11 |
| B | 3 | 1 | 235 | 1.2 | 30 | 2 |
| C | 6 | 2 | 272 | 1.1 | 29 | 84 |
| D | 3 | 1 | 258 | 1.2 | 31 | 85 |
| E | 6 | 2 | 250 | 1.1 | 31 | 89 |
| F | 3 | 1 | 231 | 1.3 | 33 | 90 |

These results illustrate the great reduction in retained chlorine damage by the present invention (solutions A and B) as compared to mixtures (solutions C, D, E and F) prepared under the teachings of U.S. Pat. 3,079,279.

Example 5

This example illustrates the durability of reduced retained chlorine damage on cellulosic textiles by the compositions of this invention as compared to 1,3-dimethylol-4,5-dihydroxy-2-imidazolidinone which currently is the most widely used crease-proofing agent in the production of sensitized fabrics for the manufacture of permanent press garments.

Two aqueous textile treating solutions were prepared.

Solution A contained 6.5% solids of 1,3-dimethylol-4,5-dihydroxy-2-imidazolidinone and does not illustrate the invention.

is N,N'-dimethylol uron and said imidazolidinone is 1,3-di-methylol-4,5-dihydroxy-2-imidazolidinone.

4. Composition as claimed in claim 2 wherein said uron is N,N'-bis(methoxymethyl uron and said imidazolidinone is a 1,3 - bis(methoxymethyl-4,5-dihydroxy-2-imidazolidinone.

5. Process as claimed in claim 1 wherein said uron is N,N'-dimethylol uron mixed with N-methylol ureas and N-methylol ureas are converted by said glyoxal to N-methylol-4,5-dihydroxy-2-imidazolidinone.

6. Process as claimed in claim 5 wherein, after said contacting step, said N,N'-dimethylol uron and 1,3-dimethylol-4,5-dihydroxy - 2 - imidazolidinone are etherified with methanol.

7. Process as claimed in claim 1 wherein, prior to said contacting step, said N,N'-dimethylol uron and said methylol ureas are etherified with methanol.

8. Cellulosic textile impregnated with the composition of claim 2.

9. Process of reducing the tendency of uron crease-proofing chemicals to impart retained chlorine damage to cellulosic textiles treated therewith which comprises impregnating said textiles with the crease-proofing uron-containing composition of claim 1 and curing said composition thereon at a temperature of 250° to 400° F. for 15 minutes to ½ minute.

References Cited
UNITED STATES PATENTS

| | | | |
|---|---|---|---|
| 3,049,446 | 8/1962 | Goldstein | 117—143 |
| 3,369,857 | 2/1968 | Fluck et al. | 117—139.4 X |
| 3,369,931 | 2/1968 | Beachem et al. | 117—139.4 |
| 2,373,135 | 4/1945 | Maxwell | 260—9 |
| 2,374,647 | 5/1945 | Burke et al. | 260—2 |
| 3,079,279 | 2/1963 | Van Loo | 117—139.4 |
| 3,089,859 | 5/1963 | Oshima | 260—45.2 |
| 3,324,062 | 6/1967 | Yim Poon | 260—29.4 |
| 3,428,607 | 2/1969 | Renner | 260—67.6 |
| 3,445,279 | 5/1969 | Abrahams et al. | 117—143 |

HOWARD E. SCHAIN, Primary Examiner

U.S. Cl. X.R.

8—116.3; 117—143 A, 145, 161 LN; 260—29.4, 70 R